(12) United States Patent  (10) Patent No.: US 7,068,008 B2
Marioni  (45) Date of Patent: Jun. 27, 2006

(54) ELECTRONIC DEVICE FOR CONTROLLING A DISCHARGE PUMP DRIVEN BY A SYNCHRONOUS ELECTRIC MOTOR WITH A PERMANENT-MAGNET ROTOR

(75) Inventor: Elio Marioni, Dueville (IT)

(73) Assignee: Askoll Holding S.r.l. (IT)

( * ) Notice: Subject to any disclaimer, the term of this patent is extended or adjusted under 35 U.S.C. 154(b) by 0 days.

(21) Appl. No.: 10/959,761

(22) Filed: Oct. 6, 2004

(65) Prior Publication Data

US 2005/0073278 A1 Apr. 7, 2005

(30) Foreign Application Priority Data

Oct. 7, 2003 (EP) .................................. 03425653

(51) Int. Cl.
*H02H 7/08* (2006.01)

(52) U.S. Cl. ...................... 318/708; 318/700; 318/711

(58) Field of Classification Search ................ 318/708, 318/700, 711, 717; 363/56.05; 323/239
See application file for complete search history.

(56) References Cited

U.S. PATENT DOCUMENTS

| 3,908,158 | A | * | 9/1975 | Studtmann .................. 318/809 |
| 5,434,491 | A | | 7/1995 | Marioni |
| 6,269,012 | B1 | | 7/2001 | Kusakabe et al. |
| 2001/0046143 | A1 | * | 11/2001 | Bruckmann et al. ..... 363/56.05 |
| 2003/0081366 | A1 | * | 5/2003 | Bruckmann et al. ........ 361/91.1 |
| 2004/0135557 | A1 | * | 7/2004 | Ryba et al. .................. 323/239 |

FOREIGN PATENT DOCUMENTS

JP 09215372 A1 8/1997

* cited by examiner

*Primary Examiner*—Karen Masih
(74) *Attorney, Agent, or Firm*—Akerman Senterfitt

(57) ABSTRACT

The present invention relates to an electronic device (10) for controlling a discharge pump, driven by a synchronous electric motor with a permanent-magnet rotor (3) and of the type comprising at least a controller (1) receiving at its input a synchronizing signal (5) of the motor supply voltage (V) and at least a second signal (7) being proportional to the current absorbed by the motor, to drive at its output a switch (6) being series-connected to one of the motor windings. Advantageously, the switch (6) is a bidirectional switch (11) comprising a diode bridge and it can be manufactured in an integrated way. In a preferred embodiment the bidirectional switch (11) is of the SCR type.

6 Claims, 9 Drawing Sheets

ELECTRONIC DEVICE FOR CONTROLLING A DISCHARGE PUMP DRIVEN BY A SYNCHRONOUS ELECTRIC MOTOR WITH A PERMANENT-MAGNET ROTOR

FIELD OF APPLICATION

The present invention relates, in its more general aspect, to a synchronous discharge pump, i.e. a pump driven by a synchronous electric motor with a permanent-magnet rotor, particularly of the type incorporated in a household appliance.

In particular, this invention relates to an electronic device for controlling said pump and of the type comprising at least a controller receiving at its input a synchronizing signal of the motor supply voltage and at least a second signal being proportional to the current absorbed by the motor, to drive at its output a switch being series-connected to one of the motor windings.

PRIOR ART

It is well known that some household appliances, such as washing machines and dish-washing machines, are provided with pumps serving to discharge outwards fluids comprising water and washing residuals.

These fluids are not accumulated in a constant and predictable way according to washing programs; consequently, it often happens that discharge pumps are operated for a predetermined time, discharging liquids as well as air and foaming agents. In substance, the discharge pump can operate sucking an air-water mixture.

During the time period wherein this kind of operation occurs, the noise produced by the pump considerably increases.

To try and remedy this drawback, the prior art suggests to apply electronic control circuits to the pumps capable of regulating the operation thereof in critical conditions.

In practise, as soon as an operating state with air-water mixture sucking occurs, the electronic control device interrupts the pump operation (i.e. it interrupts the synchronous electric motor operation) for a certain time. The interruption period is predetermined and it depends on the household appliance wherein the pump is used.

The interruption can last even a few seconds, after which the pump is restarted assuming that, in the meantime, a valuable amount of liquid has been accumulated, which is sufficient to avoid the partial-load operation, which is noisy and also unstable.

There are different operating modes depending on the kind of household appliance. In any case, the electronic control device is capable of recognising the air-water operating state and, consequently, it is capable of interrupting the pump operation.

FIG. 1 schematically shows a first embodiment of an electronic device of the known type showing how the synchronous motor starting step is regulated according to a network synchronizing signal and a signal provided by a Hall-effect rotor position sensor.

As shown in FIG. 1, an electronic control device, controller 1, receives at its input a signal 4 coming from a rotor position sensor 2 of the motor 3, and a network synchronizing signal 5. The controller 1 drives a static power switch 6, for example a TRIAC being series-connected to one of the stator windings.

As it is known, the position sensor 2, which in the case of a permanent-magnet synchronous motor can be very conveniently a Hall-effect sensor, provides an angle coinciding, except for a constant, with the load angle $\partial$.

For example, with a digital Hall sensor 2, the passage of the rotor magnetic flux peak can be measured. Knowing that the latter is delayed by 90° with respect to the counter electromotive force, the load angle $\partial$ can be precisely determined as phase shift between the voltage applied to the motor 3 terminals. This voltage is known by means of the network synchronizing signal 5.

The phase shift $\partial$ is thus determined by the controller 1 taking as reference the network synchronizing signal 5 which is a square wave signal, with rising and falling edges coinciding with the supply voltage zero-crossing.

FIGS. 2 and 3 show two vector diagrams of the voltage V, of the current I and of the counter electromotive force E, related to two different operating conditions wherein the load angle $\partial$ is different.

FIG. 2 schematically shows a vector diagram allowing a better understanding of the calculations performed in the controller 1.

X indicates the stator winding inductance;
R is the resistance of these windings;
I is the supply current;
V is the supply voltage;
$\partial$ is the load angle;
$\phi$ is the phase shift between the supply voltage and the current;
Eo is the counter electromotive force.

FIG. 3 shows the same diagram but related to a different operating condition with a different load angle.

In practise, with the electronic device of FIG. 1, it is easy to detect the air-water operation, since the load angle $\partial$ considerably varies with respect to the normal operation.

The different operating modes to be identified are very distinct; for example, regular full load operation and air-water operation, to be thus able to turn the pump off in the latter case to avoid useless noises.

During these two different operations, even in various voltage and prevalence conditions, very different load angles $\partial$ are obtained, explaining more reasonable, but however significant, variations of the phase shift angle between the voltage and the current $\phi$, as shown in the diagrams of FIGS. 2 and 3.

On the basis of the previous considerations, it is possible to prepare an electronic device being arranged only for reading the phase shift between the voltage and the current, as schematically shown in FIG. 4.

After all, the phase shift between the Sync signal 5 and a Current signal 7, conveniently adopted and squared off, is measured by means of a sensor 8.

Being it possible to equip the controller 1 with logic and/or calculation means, it is not very expensive to compare the measuring stability of said phase shift in a convenient time period, a stable full load pump operation index, with a possible instability, a certain air-water pump operation index.

A further possibility thus results, which can also be used to obtain a confirmation, of identifying the difference between the two states concerned, allowing the desired operating mode to be reached. The pump operates in a silent way and with full load and it is turned off when a certain amount of air is accumulated in the pump coil; after a certain time, when the water amount is sufficient to discharge in a stable and silent way, the pump is restarted.

Although advantageous under different points of view, the previously described electronic circuits have some drawbacks; for example they are delicate from the point of view of noises, since they provide complex and/or highly amplified signal regulation blocks.

Moreover, the urgent demand for cost reduction imposes the use of simple and non very expensive components however capable to ensure operation reliability and a long pump service life.

In this context it is worth noting that when the pump is driven by a Triac, also an expensive thermal protection of the pump itself must be provided, because of the rigorous reliability tests undergone by the pump. In fact Triacs undergo failure tests of the "diode mode" type keeping the rotor blocked and these operating conditions leave motor windings live with subsequent pump overheating and permanent damage risk.

The problem underlying the present invention is to provide an electronic device for controlling a synchronous discharge pump, particularly for household appliances, having such structural and functional features as to allow all the drawbacks mentioned with reference to the prior art to be overcome in a simple and unexpensive way.

SUMMARY OF THE INVENTION

This solution idea underlying the present invention is to manufacture an electronic device as previously described wherein the control switch is a bidirectional switch comprising a four-diode bridge. Advantageously, this switch is an SCR device and it is monolithically integrated as motor driving switch.

The present invention relates to a discharge pump controlled by an electronic device which is driven by a synchronous electric motor having a permanent-magnet rotor. The electronic controlling device can comprise at least a controller receiving at its input a synchronizing signal of the motor supply voltage and at least a second signal which is proportional to the current absorbed by the motor, to drive at its output a switch which is series-connected to one of the motor windings. Advantageously, the switch is a bidirectional switch which may comprise a diode bridge and can be manufactured in an integrated way. In a preferred embodiment, the bidirectional switch may be of the SCR type.

The other features and the advantages of the electronic device for controlling a synchronous discharge pump will be more apparent from the description of an embodiment thereof, given hereafter with reference to the attached drawings given by way of indicative and non-limiting example.

DETAILED DESCRIPTION OF A PREFERRED EMBODIMENT

Figure 1:
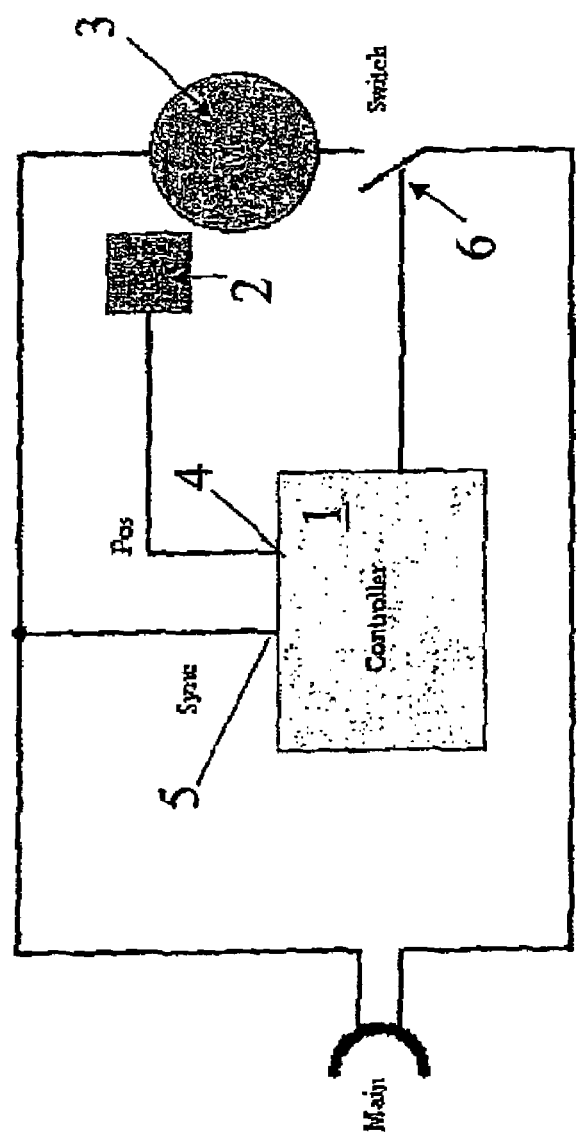
FIG. 1 schematically shows a first embodiment of electronic device for controlling a discharge pump, driven by a permanent-magnet synchronous electric motor and used in a household appliance, according to the prior art.
Figure 2:
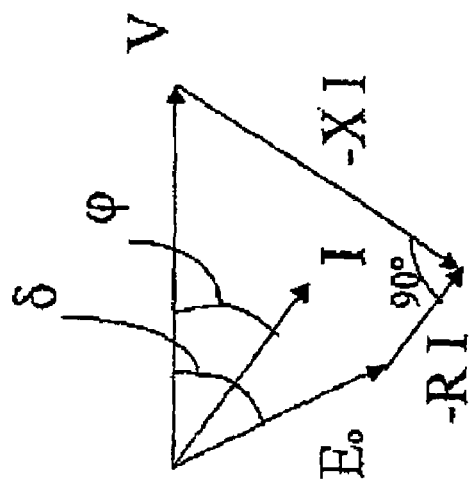
FIGS. 2 and 3 schematically show two vector diagrams of the voltage V, of the current I absorbed by the motor in two different operating conditions, i.e. two diagrams with different load angle and subsequently different phase shift.
Figure 3:
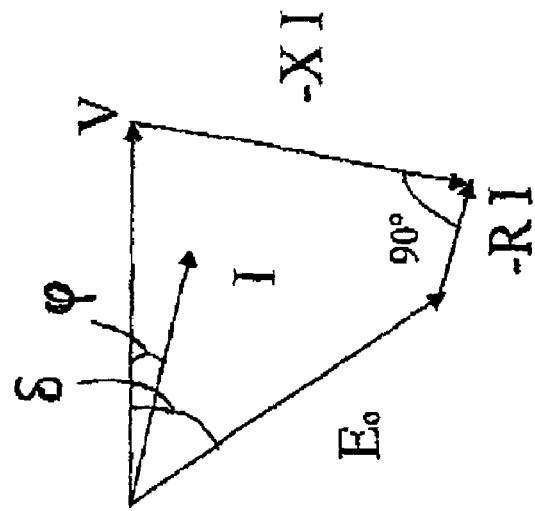
Figure 4:
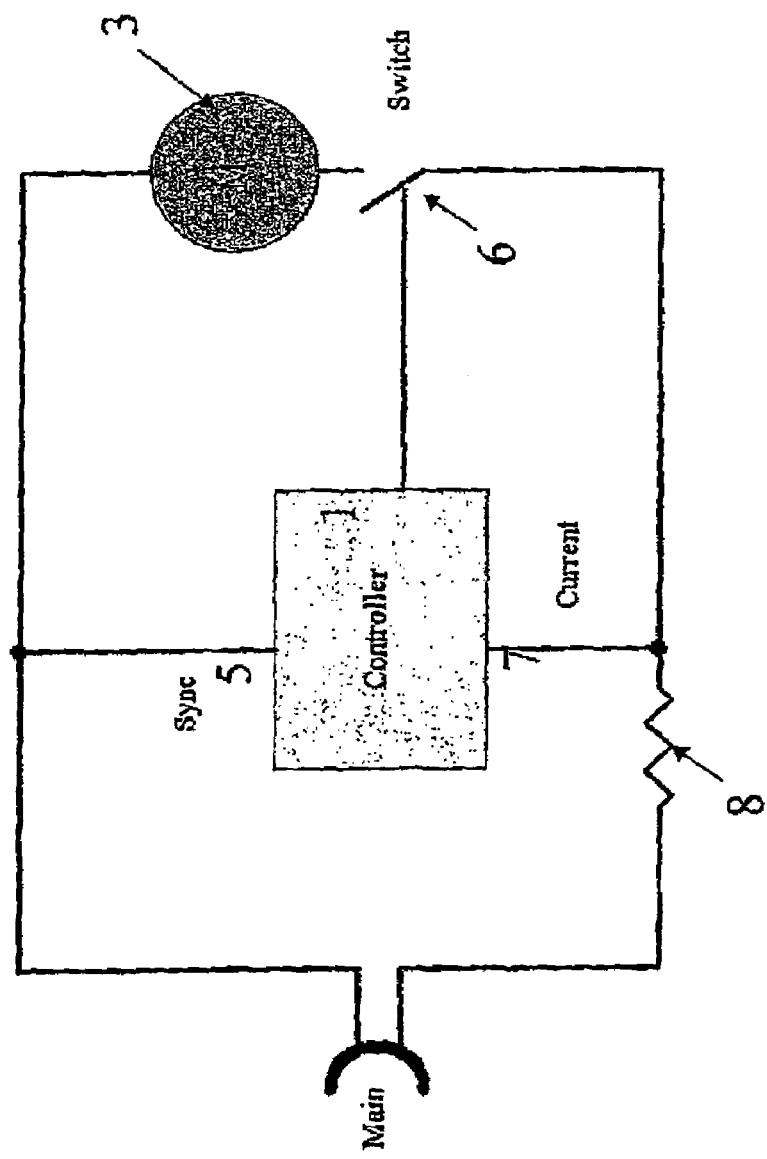
FIG. 4 schematically shows a second embodiment of electronic control device, according to the prior art.
Figure 5:
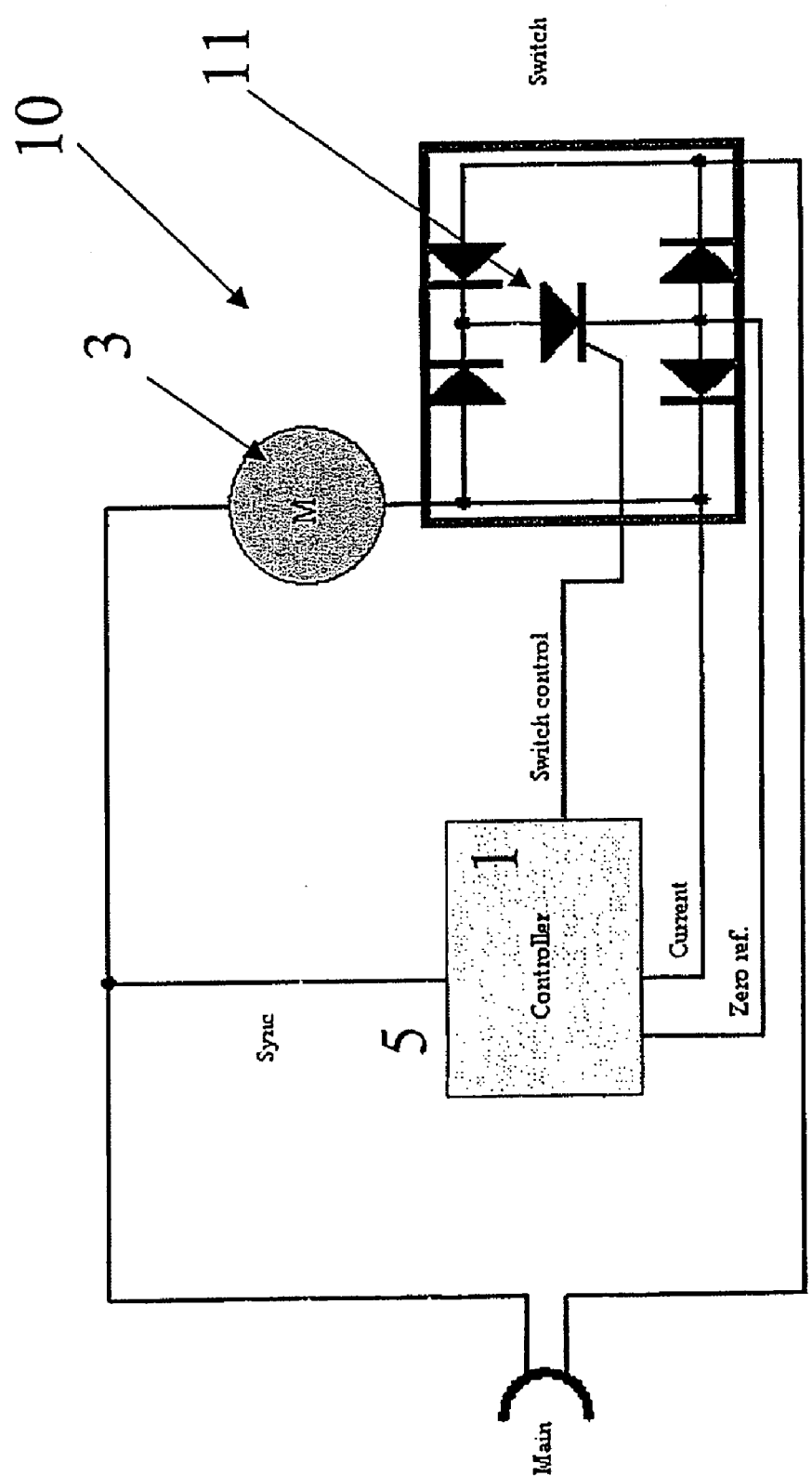
FIG. 5 schematically shows an electronic device for controlling a discharge pump, driven by a permanent-magnet synchronous electric motor and used in a household appliance, according to the present invention.

With particular reference to FIGS. 5 to 10, an electronic device manufactured in accordance with the present invention for controlling a discharge pump 15 driven by a permanent-magnet synchronous electric motor 3 and incorporated in a household appliance (not shown in the figures) is described in detail and globally indicated with 10.

As previously seen, with reference to the prior art, the device 10 conventionally comprises at least a controller 1 receiving at its input a synchronizing signal 5 of the supply network voltage V of the motor 3 and at least a second signal 7 being proportional to the current absorbed by the motor, to drive at its output a switch 6 being series-connected to one of the motor windings.

Advantageously according to the present invention the switch 6 is manufactured with a bidirectional switch, particularly a device 11 comprising a four-diode bridge.

In substance, the Triac 6 is replaced by a bidirectional switch, for example an SCR device as central element of a power-diode bridge.

The apparent greater complexity is rewarded by the lower gate current required by the SCR device 11 switching. This is an important advantage for the cheapest auxiliary supply.

The SCR device 11 has advantageously an overall cost being lower or equal to another kind of switch, but it also offers the possibility of having a univocal and clear current zero crossing signal, thus avoiding complex and/or highly amplified signal regulation blocks, which are then more delicate from the point of view of noises, as in prior art devices.

It is worth noting that two different circuits according to the current sense participate in device 11.

This distinctive feature will now be described in greater detail.

Figure 6:
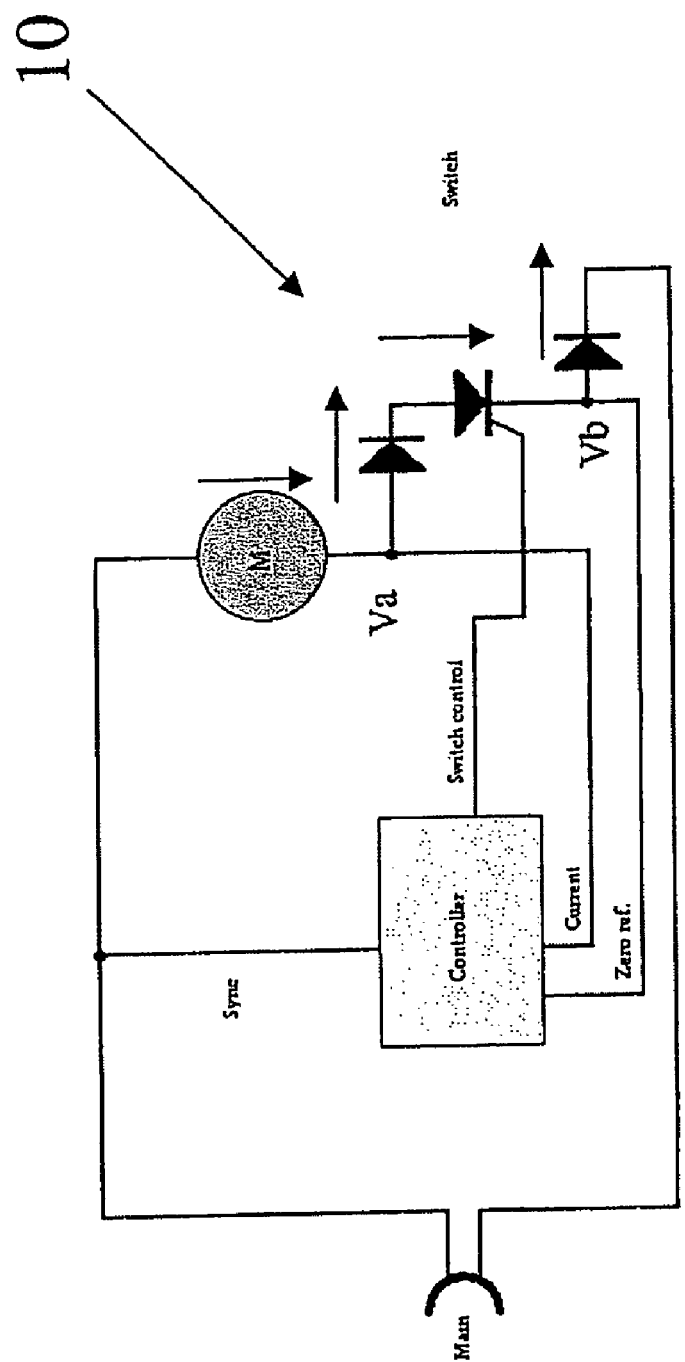
FIGS. 6 and 7 define the operating logic of the electronic device of FIG. 5.
Figure 7:
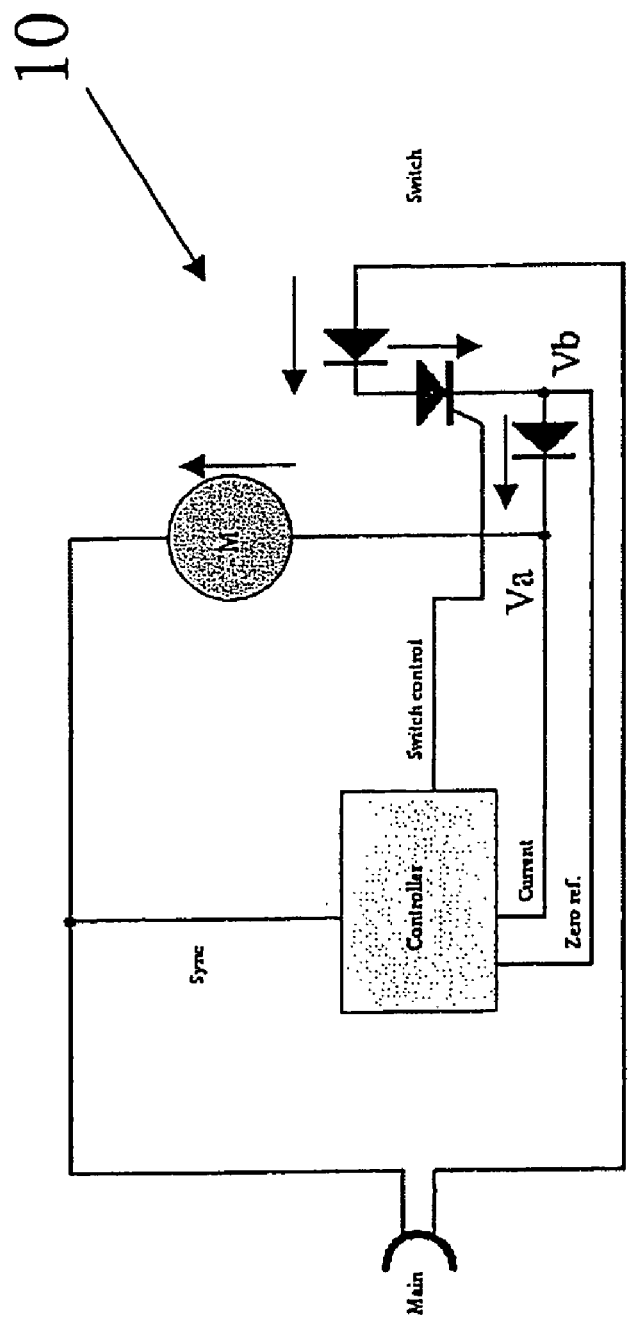

By examining, thanks to FIG. 6, the voltage signal Va with respect to the voltage signal Vb, as shown in both FIGS. 6 and 7, two operating situations with two very different voltages occur.

With positive current (FIG. 6)

$$Va-Vb=Vd+Vscr$$

Where Vd is the drop by direct conduction of one of the bridge diodes and Vscr is the drop by SCR direct conduction.

Values of about 1.3/2 V are obtained, according to the components being used.

With negative current (FIG. 7)

$$Va-Vb=-Vd$$

And a value of about −0.6/1 V is obtained

Figure 8:
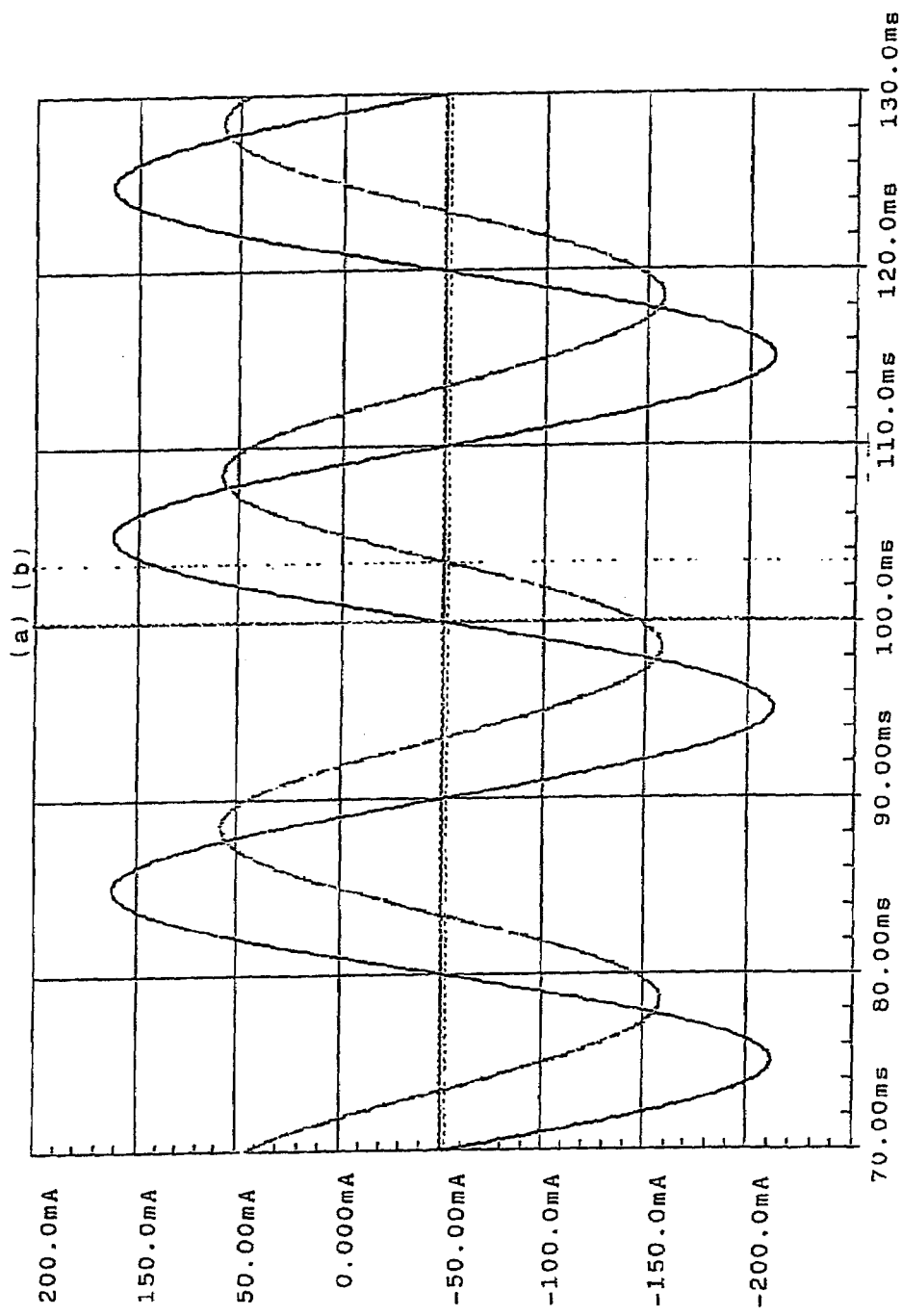
FIGS. 8 and 9 show graphs processed by the electronic device of FIG. 5.
Figure 9:
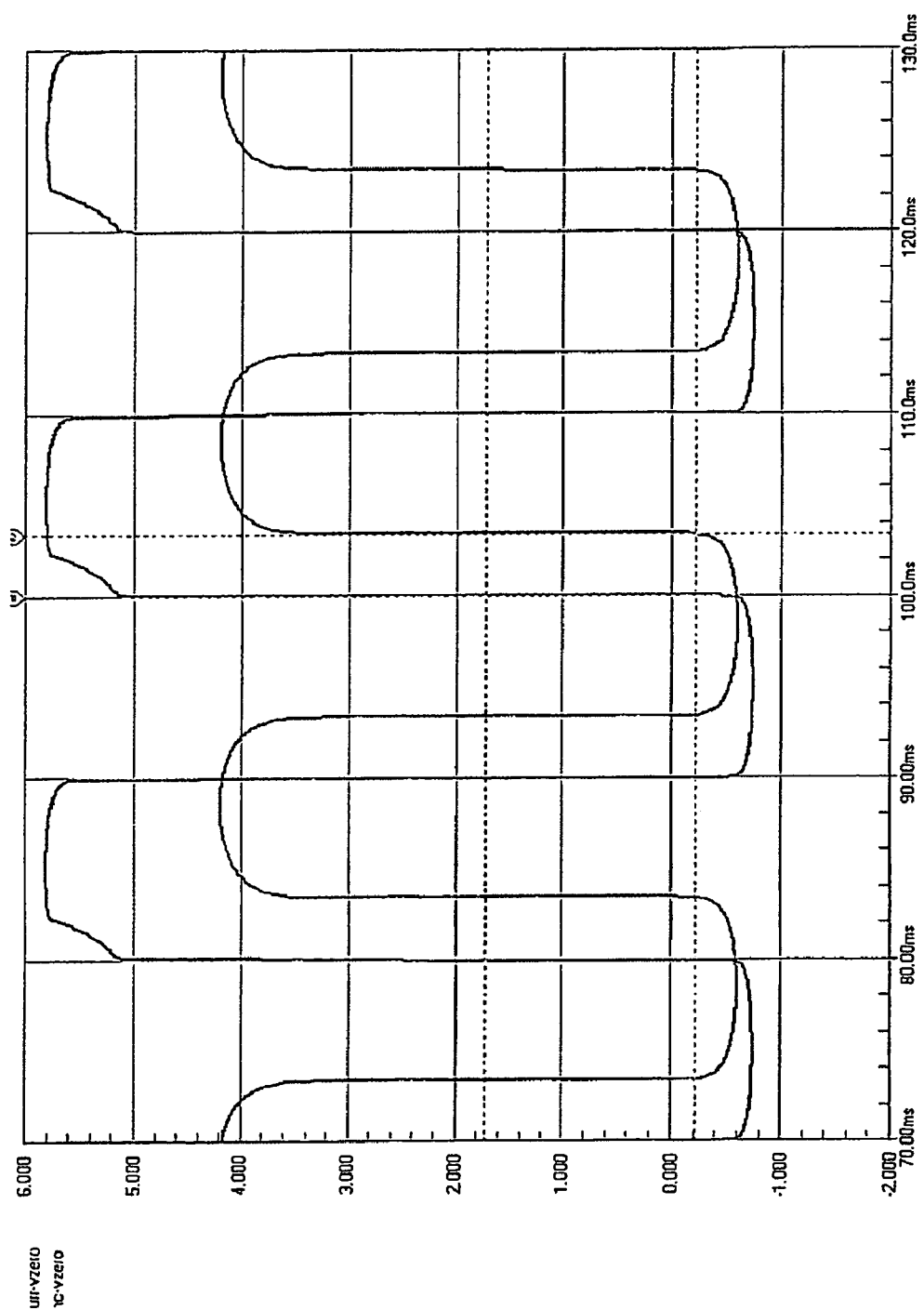

The diagrams of FIGS. 8 and 9 show the graphs of the quantities network Voltage, Current and corresponding values SYNC (squared network voltage) and Current Oust described Va–Vb).

As it can be noted, they are univocal signals being perfectly in phase with the quantities they refer to and wherefrom the phase angle φ between the supply voltage, V and the current I can be easily calculated.

The amplitudes of these signals can be directly processed by low voltage logics being available on the market (1.8 V).

The square wave value of the Current signal 7 with positive sense current can be greater by adding in series a convenient resistance or another junction, according to the needs.

This variation does not invalidate the Current value with negative sense current.

The main advantage achieved by the electronic device according to the present invention is its unusual simplicity, reliability and extremely low cost.

The switch 11 is not a Triac and then the application must not undergo a failure test of the "diode mode" type.

If however the "diode mode" test would have to be performed, it would not cause dangerous operating conditions just because of the presence of device 11; because the motor would keep running since both half waves would be provided and no particular heating condition would occur.

Moreover, the device 11 is suitable for being monolithically manufactured together with the controller 1 as integrated circuit with control pins directly connecting to the motor. In this case short-circuit or open-circuit failure tests could be performed; both situations would not be however dangerous since the motor would run or would be blocked according to the case, without power crossing.

With such a solution it is possible to manufacture, complying with the rules, a pump without thermal protector, i.e. examining, if necessary, a failure at a time.

The thermal protection could be even removed if also the "blocked rotor" failure test could be controlled: in this case the controller 1 can detect the rotor blocked through the phase shift between voltage and current, then through the anomalous phase shift between the SYNC and Current signals 5 and 7, with blocked rotor.

However, according to the needs, it is possible to provide a thermal protection also for the device according to the invention. For example, if for some applications the phase shift would be similar to normal operating conditions, by means of a simple low-cost thermal sensor, optionally mounted on the same housing board 18 of the SCR device, the controller 1 could acquire the dangerous state and stop the supply.

Figure 10:
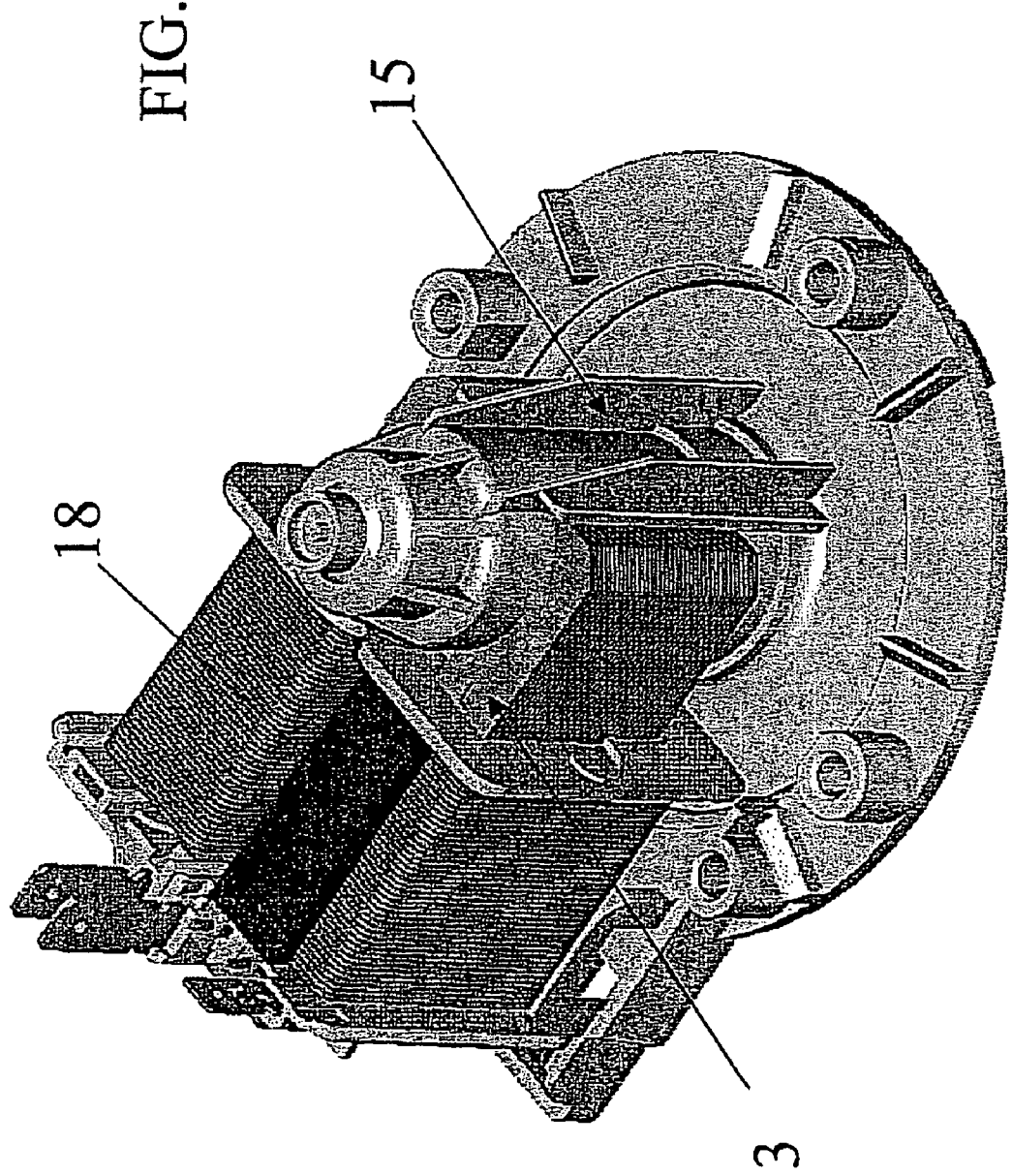
FIG. 10 is a perspective schematic view of a discharge pump incorporating an electronic control device according to the invention.

For example, as shown in FIG. 10, a housing and supplying board 18 of the device 11 can be provided in a recess formed between two motor windings. On this board 18 the thermal sensor could be housed on the opposite side with respect to the device 11, ensuring however a sufficient pump thermal protection.

Since the controller 1 is an arithmetical-logic integrated circuit, it is also possible to exploit the calculation capability thereof to perform redundant controls to ensure the operating safety.

The electronic device 10 for controlling a synchronous discharge pump as previously described can undergo some modifications, all within the reach of the skilled in the art and falling within the scope of protection of the present invention, as defined in the following claims.

The invention claimed is:

1. A discharge pump, wherein the discharge pump does not require thermal protection, said discharge pump comprising:
    an electronic device for controlling the discharge pump, wherein the electronic controlling device is driven by a synchronous electric motor having a permanent-magnet rotor,
    at least a controller receiving at its input a synchronizing signal of the motor supply voltage (V); and
    a bidirectional switch series-connected to one of the motor windings driven by at least a second signal proportional to the current absorbed by the motor.

2. The discharge pump according to claim 1, wherein said bidirectional switch comprises a diode bridge.

3. The discharge pump according to claim 1, wherein said bidirectional switch is of the SCR type.

4. The discharge pump according to claim 2, wherein said bridge comprises four power diodes.

5. The discharge pump according to claim 1, wherein it is manufactured in a monolithically integrated way.

6. The discharge pump according to claim 1, wherein it is associated with a thermal sensor mounted on a housing board of the device.

* * * * *